United States Patent
Seo et al.

(10) Patent No.: US 6,517,606 B2
(45) Date of Patent: Feb. 11, 2003

(54) MORPHOLOGICALLY CONTROLLED THERMOTROPIC LIQUID CRYSTALLINE POLYMER BLENDED HIGH SELECTIVE GAS SEPARATION MEMBRANES

(75) Inventors: Yongsok Seo, Seoul (KR); KwangUng Kim, Seoul (KR); SoonMan Hong, Seoul (KR); Seungsang Hwang, Seoul (KR); Seong Uk Hong, Seoul (KR)

(73) Assignees: Korea Institute of Science and Technology, Seoul (KR); Bionast Co., Ltd., Kyungki-Do (KR)

( * ) Notice: Subject to any disclaimer, the term of this patent is extended or adjusted under 35 U.S.C. 154(b) by 0 days.

(21) Appl. No.: 09/886,604

(22) Filed: Jun. 21, 2001

(65) Prior Publication Data

US 2002/0043155 A1 Apr. 18, 2002

(51) Int. Cl.⁷ .......................... B01D 53/22; B01D 71/64
(52) U.S. Cl. .................. 95/45; 95/54; 96/4; 96/14; 55/DIG. 5
(58) Field of Search .......................... 95/45, 54; 96/4, 96/13, 14; 55/DIG. 5

(56) References Cited

U.S. PATENT DOCUMENTS

| | | | | |
|---|---|---|---|---|
| 5,055,116 A | * | 10/1991 | Kohn et al. | 96/14 X |
| 5,061,298 A | * | 10/1991 | Burgoyne, Jr. et al. | 96/14 X |
| 5,232,472 A | * | 8/1993 | Simmons et al. | 96/14 |
| 5,248,319 A | * | 9/1993 | Ekiner et al. | 96/14 X |
| 5,310,415 A | * | 5/1994 | Simmons et al. | 95/45 |
| 5,505,851 A | * | 4/1996 | Wagener et al. | 96/14 X |
| 5,599,380 A | * | 2/1997 | Koros | 95/54 |
| 5,716,430 A | * | 2/1998 | Simmons | 96/13 |
| 5,725,633 A | * | 3/1998 | Ozcayir et al. | 95/45 |
| 5,820,659 A | * | 10/1998 | Ekiner et al. | 96/14 X |
| 5,917,137 A | * | 6/1999 | Ekiner | 96/14 X |
| 5,922,104 A | * | 7/1999 | Park et al. | 96/14 X |
| 6,296,684 B1 | * | 10/2001 | Ekiner et al. | 96/14 X |
| 6,383,265 B1 | * | 5/2002 | Ekiner | 96/14 X |

* cited by examiner

*Primary Examiner*—Robert H. Spitzer
(74) *Attorney, Agent, or Firm*—Darby & Darby

(57) ABSTRACT

Liquid crystalline polymer blended gas separation membranes are obtained by melting and processing 50~99 wt % of a thermoplastic resin, 1~50 wt % of a thermotropic liquid crystalline polymer and 0.1~10 wt % of a compatibilizer based on the weight of the thermotropic liquid crystalline polymer. A method for fabricating liquid crystalline polymer blended gas separation membrane includes the steps of: mixing 50~99 wt % of thermoplastic resin, 1~50 wt % of thermotropic liquid crystalline polymer and 0.1~10 wt % of compatibilizer based on the weight of the thermotropic liquid crystalline polymer; and biaxially extruding the resulting blend melt from an extrusion die of a film blowing apparatus to fabricate a film. The gas separation membrane exhibits high permeability exceeding the limit value which has been hardly overcome by the existing separation membranes. This enhanced permeability is ascribed to the morphology of the ternary blends and different interaction between the compatibilizer and diffusing gases

22 Claims, 2 Drawing Sheets

1 μm

MORPHOLOGICALLY CONTROLLED THERMOTROPIC LIQUID CRYSTALLINE POLYMER BLENDED HIGH SELECTIVE GAS SEPARATION MEMBRANES

BACKGROUND OF THE INVENTION

1. Field of the Invention

The present invention relates to a composite gas separation membrane and its preparation method. The gas separation membrane of the present invention which is produced by blending thermoplastic resin, liquid crystalline polymer and compatibilizer to control the dispersion state of the liquid crystalline polymer in the thermoplastic resin and adhesion at the interface, and then biaxially drawing the obtained blended mixture is capable of increasing a selective permeation rate in such a manner that the dispersed liquid crystalline polymer is morphologically altered to serve as an obstacle to a gas permeation, by which the permeation distance of the gas is elongated, which in turn enhances the selective permeability over the so-called trade-off limit. More particularly, a liquid crystalline polymer which is hardly permeable to a gas is dispersed in a thermoplastic resin, and at this time, an appropriate amount of compatibilizer is added so as for the liquid crystalline polymer to have a uniform size and well dispersed state, and then, the mixture is biaxially drawn in a film blowing process to obtain a thin film, whereby, the liquid crystalline polymer phase evenly dispersed and morphologically controlled in the film works as an obstacle to diffusion of gases, to thereby morphologically altering path length of gases. The gases are separated according to interaction difference which induces diffusion time difference during which the gases pass the deformed path by using diffusion constant difference depending on the size of the gas molecule, thereby exhibiting a selectivity of a gas higher than the limit value.

2. Description of the Background Art

Polymeric separation membranes are used for various gas separation processes which are technologically important such as separation of air, separation of carbon dioxide from a natural gas, or separation of nitrogen or hydrocarbon and hydrogen in a petrochemical process.

A basic factor determining the separation performance of separation membranes for a pair of gases (i.e., oxygen/nitrogen, carbon dioxide/methane or hydrogen/nitrogen, etc.) is a permeability constant and a selectivity. Permeability constant is typically obtained by dividing the multiplied value of a gas concentration difference and the thickness of separation membrane by a pressure difference of both sides of the separation membrane. Selectivity is a ratio of permeability of two gases. That is, when the selectivity ratio is represented by A/B, 'A' is the permeability of high permeable gas and 'B' is the permeability of low permeable gas.

High performance separation membranes are desired to have a high permeability and a high selectivity, because a high permeability allows to reduce an area of separation membranes required for separating a certain amount of gas and a high selectivity allows to enhance the purity of a produced gas.

However, generally, if the separation membranes have a high permeability, it has a low selectivity, while if a separation membrane has a high selectivity, it has a low permeability.

According to Robeson's observation, as to separation of several pairs of gases, most polymer separation membranes have a negative slope in the correlation between the selectivity and the permeability (Journal of Membrane Science, Vol. 62, 165, 1991, USA). That means the selectivity is reduced as the permeability is increased.

In addition, upon observation of performance of numerous polymer separation membranes, it has been revealed that most of the polymer separation membranes do not exhibit a performance higher than a certain level.

That is, for each permeability, there exists an upper limit of the selectivity, along which an inversely proportional relation exists between the selectivity and the permeability all the time.

The reason why such an upper limit exists is a natural result as the hard chains of a glass phase polymer substance screen the gas molecules.

The slope of the upper limit has no relation to a chemical structure of the polymer separation membranes.

For the last 30 years, in order to simultaneously increase the selectivity and the permeability, most researchers in the separation membrane industrial field have exerted their energy on synthesizing a novel polymer (for example, U.S. Pat. No. 5,725,633). However, though many researches have been conducted, there has been no report on polymer separation membranes having a performance exceeding the existing upper limit.

The present invention is directed to a fabrication process of a polymeric gas separation membrane which overcomes the limitation of the upper limit on the basis of a novel concept of a polymer composite instead of synthesizing a new polymeric material.

The polymer composite separation membranes have been frequently used in the separation industries. In most cases, it is related to fabrication of a hollow fiber membrane as a blocking body of a solvent (i.e., U.S. Pat. No. 5,310,415, etc.) and partly it is related to addition of an inorganic substance serving as a filler (Journal of Membrane Science, Vol.133,207).

In such a case, however, the adhesion at the interface and the uniform dispersion are problematic in measuring the performance of separation membranes.

Because of their excellent blocking property, liquid crystalline polymers have been subjected to many researches as a separation material (Journal of Membrane Science, Vol. 94, 67), but only a few researches have been conducted on the composite separation membrane material mixed with a liquid crystalline polymer (U.S. Pat. No. 5,599,380). The reason for this is that most liquid crystalline polymer exhibits incompatibility with respect to the thermoplastic resins, thus forms a separate phase. Therefore, it is very difficult to obtain a uniform dispersion and the adhesion at the interface is poor.

SUMMARY OF THE INVENTION

Therefore, an object of the present invention is to provide a process for fabricating a blend allowing a uniform dispersion and having an improved interface adhesion by adding a thermotropic liquid crystalline polymer to a thermoplastic resin and at the same time, adding a compatibilizer so that the compatibilizer works at the interface of the liquid crystalline thermoplastic resin to lower the interfacial tension, to provide a process for fabricating membranes with a desired thickness by performing biaxial drawing and extrusion by a film blowing process, and to produce composite separation membranes for gas separation exhibiting a high selectivity in such a manner that an impermeable liquid crystalline polymer uniformly dispersed in the film is formed in a thin and long disk type, working as an obstacle to a gas permeation to change a curvature for a diffusing gas so that the gas passes through the channel at the interface where the gas is separated due to a difference of the interaction with the compatibilizer.

Another object of the present invention is to optimize dispersion of a thermotropic liquid crystalline polymer by using an optimum amount of the compatibilizer.

Still another object of the present invention is to utilize a film blowing process, a biaxial drawing process, for fabricating thin film membranes to let the dispersed phase have a different axial ratio, so that a three-dimensional thin film turns out to have a two-dimensional geometrical form when the gas permeates.

Yet another object of the present invention is to provide a method for fabricating liquid crystalline polymer blended high selective gas separation membranes.

Still yet another object of the present invention is to provide a method for separating a gas by using the liquid crystalline polymer blended high selective gas separation membranes.

To achieve these and other advantages and in accordance with the purpose of the present invention, as embodied and broadly described herein, there is provided liquid crystalline polymer blended gas separation membranes obtained by melting and processing 50~99 wt % of thermoplastic resin, 1~50 wt % thermotropic liquid crystalline polymer and 0.1~10 wt % of compatibilizer for the thermotropic liquid crystalline polymer and the matrix polymer.

To achieve the above objects, there is further provided a method for fabricating liquid crystalline polymer blended gas separation membranes, including the steps of: mixing 50~99 wt % of thermoplastic resin, 1~50 wt % thermotropic liquid crystalline polymer and 0.1~10 wt % of compatibilizer of the thermotropic liquid crystalline polymer; and injecting the resulting mixture in an extrusion die of a film blowing apparatus to fabricate a biaxially oriented film.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a photograph of a scanning electron microscope of a section of a membrane generated in accordance with a preferred embodiment of the present invention, of which FIG. 2 is a photograph of a transmission scanning electron microscope of a section of a membrane generated in accordance with a preferred embodiment of the present invention, of which

DETAILED DESCRIPTION OF THE PREFERRED EMBODIMENTS

Figure 1A:
FIG. 1A is a scanning electron microscope of a membrane section generated by binary blend system of liquid crystalline polymer (10 wt %)/Ultem.

Reference will now be made in detail to the preferred embodiments of the present invention, examples of which are illustrated in the accompanying drawings.

A liquid crystalline polymer blended high selective gas separation membrane of the present invention comprises a thermotropic liquid crystalline polymer, a thermoplastic resin and a compatibilizer.

In the present invention, the thermotropic liquid crystalline polymer is used in the amount of 1~50 wt %, preferably 5~25 wt %, and contains a part or the whole of the following components.

a) Aromatic moiety containing an oxy group or a carboxyl group b) Aromatic moiety containing an oxy group at both ends c) Aromatic moiety containing a carboxyl group at both ends d) Aromatic moiety having an amine group at one end and a carboxyl group at the other end e) Aromatic moiety having an amine group at one end and an oxy group at the other end.

That is, under the condition that the substituent R is aromatic hydrocarbon, the liquid crystalline polymer contains a part or the whole of the components selected from the group consisting of a) —O—R—CO—, b) —O—R—O—, c) —OC—R—CO—, d) —NH—R—CO— and e) —NH—R—O—. The liquid crystalline polymer is obtained by polymerizing (for example, copolymerization, block polymerization, graft polymerization, etc.) at least one monomer selected from the group consisting of HO—R—COOH, HO—R—OH, HOOC—R—COOH, $NH_2$—R—COOH and $NH_2$—R—OH.

The aromatic hydrocarbon (R) is not especially limited but preferably selected from the group consisting of

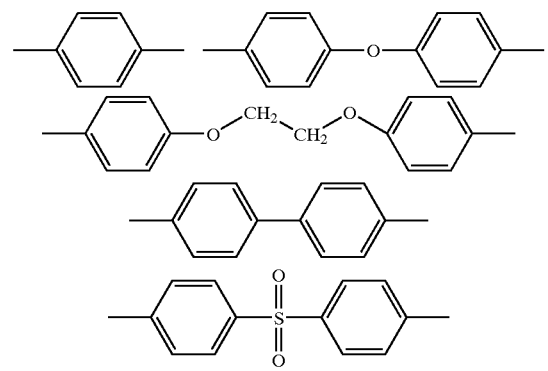

-continued

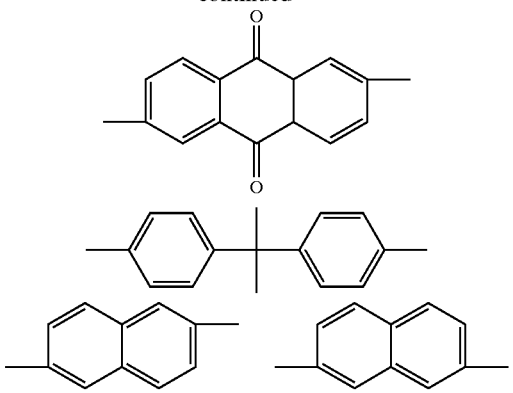

Hydrogen atoms of the above aromatic hydrocarbon ring can be substituted with a substituent selected from the group consisting of an alkyl group, alkoxy group, a halogen such as fluorine, chlorine, bromine and iodine, a phenyl group or their combined element, and a phenyl group substituted with halogen and alkoxy group or alkyl group.

In the case that the both ends comprise two oxy groups, its chemical structure is —O—R—O—, and more specifically, the following structures are preferred.

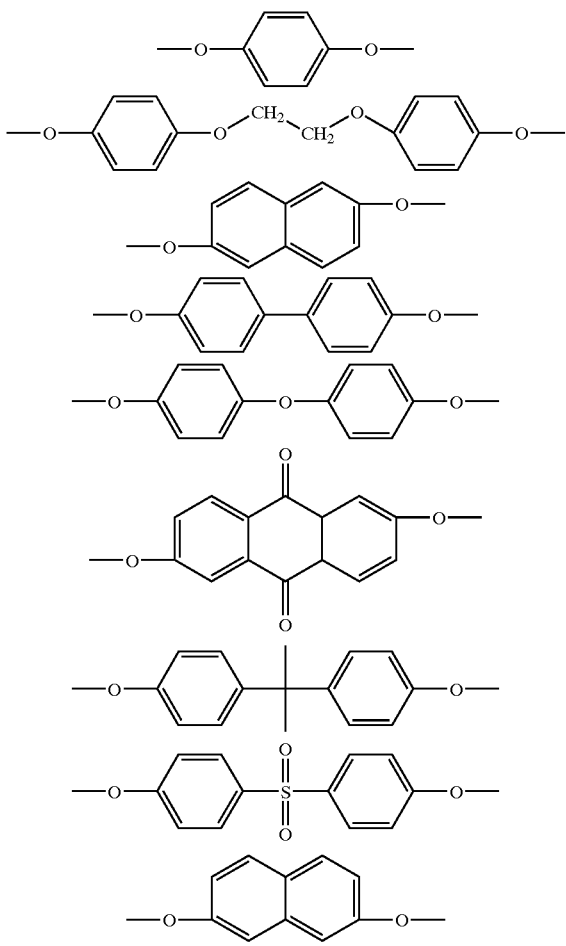

The aromatic moieties having carboxyl groups at both ends can be obtained from aromatic dicarboxylic acid or their esters. For example, it can be terephthalic acid, isophthalic acid, 2,6-naphthalenedicarboxylic acid, 2,7- naphthalenedicarboxylic acid, dibenzoic acid, 4,4'-dicarboxydiphenyl sulfide, 4,4'- dicarboxyphenylic acid, 4,4'-dicarboxydiphenylmethane, 4,4'-dicarboxydiphenoxyethane, and 2,2'-bis(4-carboxyphenyl) propane. It is preferred that the aromatic moiety containing two carboxyl groups is obtained from terephthalic acid, isophthalic acid or their mixture. Hydrogen atoms in the aromatic ring may be substituted with alkyl or alkoxy group, phenyl group or halogen (fluorine, chlorine, bromine or iodine) and the benzene ring of the substituted phenyl group may also have a substituent.

In addition, besides the aromatic moiety of the above-described structure, compounds containing amine group may also have an additional amine and carboxyl group or hydroxy group. That is, it can be mentioned p-aminobenzoic acid, p-aminophenol, p-N-methylaminophenol, p-phenylenediamine, N, N'-dimethyl-p-phenylenediamine, m-aminophenol, 4-amino-1-naphthol, 4-amino-4'-hydroxydiphenylethane, 4-amino-4'-hydroxydiphenylsulfone, 4-amino-4'-hydroxydiphenylsulfone, 2,5-diamino toluene, 4,4'-ethylene diamine, 4,4'-diamino diphenoxyethane, 4,4'-diaminophenylmethane, and 4,4'-diaminodiphenylether.

Beside these structures, the thermotropic liquid crystalline polymers may contain sulfone, urethane, carbonate, imide, ketone, sulfide, azo, anhydride and thioester, solely or in combination, which contain mesogenic group representing a liquid crystal property.

The Example of commercially used thermotropic liquid crystalline polymers include Vectra series (Celanese Hoechst, USA), XYDAR series (Amoco, USA), RODRUN series (Unitika, Japan), ECONOL series (Sumitomo Chemical Co. Ltd., Japan), Xenite and LC3000 (DuPont, USA), which are also adaptable to the present invention.

In the present invention, the thermoplastic resin is used in an amount of 50~99 wt %, and preferably, 75~95 wt % and it is preferred that it does not decompose at a process temperature not less than a nematic transition temperature of the liquid crystalline polymer. In this respect, a melt viscosity is preferred to be higher than the viscosity of the liquid crystalline polymer but is not necessarily required.

In the present invention, any commercial thermoplastic resin can be used. In this respect, according to a preferred embodiment of the present invention, Ultem 1000 (a product of G.E. of USA), a polyetherimide thermoplastic resin, provided a favorable result.

In the present invention, the compatibilizer is used in an amount of 0.1~10 wt %, preferably 0.1~5 wt %, and most preferably 1.5 wt % based on the amount of thermotropic liquid crystalline polymer. The compatibilizer is positioned at the interface of the matrix resin and the liquid crystalline polymer, lowering the interfacial tension between the liquid crystalline polymer and the matrix resin, improving dispersion, and strengthening the interfacial adhesion.

Especially, it is preferred not to decompose at a process temperature of a liquid crystalline polymer and the matrix resin, to be positioned at the interface of dispersed phase to lower the interfacial tension and accordingly evenly disperse the dispersed phase, and to improve the adhesion at the interface.

A compatibilizer used in the present invention can be any compound giving compatibility to the matrix thermoplastic resin and the liquid crystalline polymer.

For example, it can be a block copolymer, a graft polymer or a copolymer generated by transamidation or transesterification.

According to the preferred embodiment of the present invention, as the compatibilizer, PEsl, a polyesterimide, provided a favorable result.

A process for preparing the liquid crystalline polymer blended high selective gas separation membrane includes the steps of: a) mixing 50~99 wt % of a thermoplastic resin, 1~50 wt % of a thermotropic liquid crystalline polymer, and 0.1~10 wt % of compatibilizer based on the thermotropic liquid crystalline polymer; b) biaxially drawing the resulting mixture after passing through the extrusion die of a film blowing apparatus to produce a film (composite film).

The liquid crystalline polymer blended in a high-selective gas-separation membrane produced by the present invention works as an obstacle against the gas permeation, so that the gas molecules should pass around the dispersed liquid crystalline phase where the compatibilizer resides, and accordingly, the gas molecules interact with the compatibilizer, and the distance for the gas molecules to diffuse out is considerably increased. The gas molecules are diffused by using the path of a free volume of the thermoplastic resin. In this respect, the diffusion coefficient is different depending on the size of the gas molecules, and thus, the diffusion flux becomes different, accordingly. Thus, as the distance along which the gas molecules pass is long, the diffusion flux between the gas molecules are differentiated, and due to the interaction with the compatibilizer, there is a difference in the distance that the gas molecules are diffused for the same time, resulting in obtaining a high selectivity.

In the preparation method of the present invention, the mixing step may be performed by a general method, such as by using a twin screw extruder, single screw extruder and an internal mixer.

The drawing step in the preparation method of the present invention is conducted in a film blowing apparatus connected to the extrusion die. The drawing must be biaxial drawing, and the dispersed liquid crystalline phase has a stripe shape, of which a drawing ratio in the flow axis direction is higher than a drawing ratio in the circumferential direction.

Instead of the extrusion die, a dual mandrel of which outside and inside are rotated in the opposite direction may be used so that the deformed liquid crystal phase may be formed as a net shape. Or, a multilayer film may be fabricated by using a multilayer-extrusion die.

The invention will be further illustrated by the following examples. It will be apparent to those having conventional knowledge in the field that these examples are given only to explain the present invention more clearly, but the invention is not limited to the examples given.

EXAMPLE

As a thermotropic liquid crystalline polymer, a raw material, Vectra B950 (Celanese Hoechst, USA) was used. Vectra B950 is a liquid crystalline polymer comprising 2-hydroxy-6-naphthalenecarboxylic acid, terephthalic acid and p-aminophenol, of which nematic transition temperature was about 283° C. As a matrix resin, Ultem1000 (G.E. USA) (polyetherimide, a thermoplastic and high heat resistant polymer) was used. As a compatibilizer, polyesterimide was used, of which preparation method is disclosed in Polymer (U.K) Vol. 35, 515, 1994. The following structures show the chemical structural formulas of the materials.

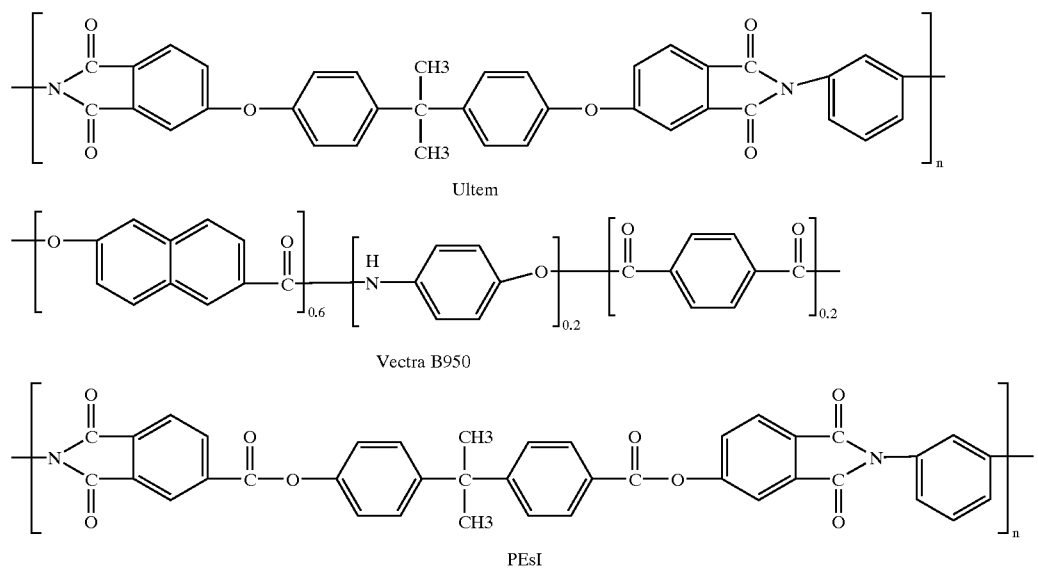

After liquid crystalline polymer, polyetherimide and compatibilizer were dried in a vacuum oven at a temperature of 100° C. for more than 24 hours, they were premixed with the ratio in Table 1. The resulting mixture was then extruded at a process temperature of 340° C. in a Bravender twin screw extruder. And then, a film blowing apparatus was connected to an exit of the twin screw extruder and the blend was subjected to a film blowing at a die exit temperature of 360° C.

An expansion ratio was adjusted with the rate of the winding speed, and the amount of gas blowing inside the parison which was film-blown, to obtain a circular film bag with a certain thickness, of which the thickness of the film was measured, and then a film with an even thickness having 3% error limit was used.

After the film samples were installed in a testing container, and an absorption gas was discharged under a high vacuum ($10^{-6}$ torr) before measuring a permeation rate.

In the testing apparatus, an isometric method was used in which a pressure increase in the opposite side of a side where a pressure was not applied was measured. The related process is described in detail in ASTM D1434-82.

Experiment was performed for the separation of oxygen and nitrogen which are most difficult to separate among the gases. The reason for this is that kinetic diameters of oxygen molecule and nitrogen molecule are respectively 3.46 and 3.64 Å, having little difference from each other. In the experiment, the upstream pressure was 1 atm and the temperature was maintained at 35° C.

In order to compare the separation capability of the three-component blend film of the present invention and a simple film (a test sample 2) made under the same condition but by mixing only two components, i.e., polyetherimide and liquid crystalline polymer, without using the compatibilizer, the respective permeability and selectivity were measured. The results are shown as follows in Table 1.

TABLE 1

| Test sample Number | Ultem wt % | Liquid crystalline polymer (Vectra B950) wt % | Compatibilizer (polyester imide) wt % | $P(O_2)$ (Barrer) | $P(N_2)$ (Barrer) | $P(O_2)/P(N_2)$ |
|---|---|---|---|---|---|---|
| 1 | 100 | 0 | 0 | 0.432 | 0.0597 | 7.24 |
| 2 | 90 | 10 | 0 | 0.225 | 0.0245 | 9.18 |
| 3 | 89.4 | 10 | 0.6 | 0.221 | 0.0184 | 12.01 |
| 4 | 88.7 | 10 | 1.3 | 0.170 | 0.0213 | 7.97 |

In case that a film is fabricated by adding the liquid crystalline polymer into polyetherimide, though the permeation rate was a bit reduced due to the addition of the impermeable liquid crystalline polymer, its selectivity was increased.

The results of ternary blend system depends on the amount of the compatibilizer.

Figure 1B:
FIG. 1B is a scanning electron microscope of a membrane section generated by ternary blend system of a liquid crystalline polymer (10 wt %)/Ultem/compatibilizer (0.6 wt %)
Figure 2A:
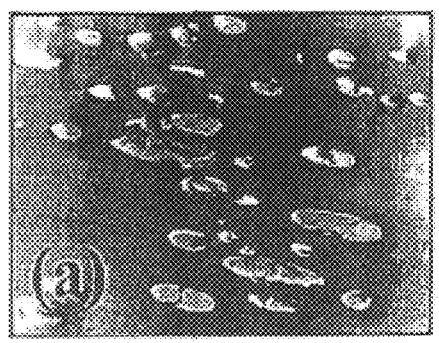
FIG. 2A is a transmission scanning electron microscope of a membrane section generated by binary blend of a liquid crystalline polymer (10 wt %)/Ultem.
Figure 2B:
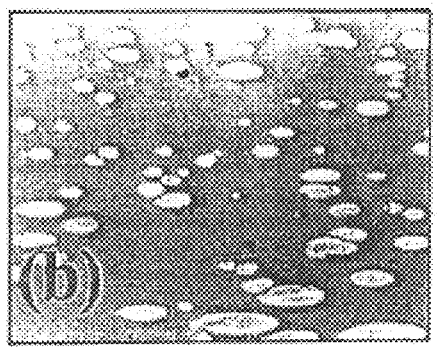
FIG. 2B is a transmission scanning electron microscope of a membrane section generated by ternary blend of a liquid crystalline polymer (10 wt %)/Ultem/compatibilizer (0.6 wt %)

When 0.6 wt % of compatibilizer was added (test sample 3), as shown in FIGS. 1B and 2B, the liquid crystalline polymer was evenly dispersed in polyetherimide, the matrix resin, of which size was remarkably reduced. Though the permeation rate was almost the same as that of the film of the binary system, the selectivity was significantly increased. The selectivity at this time exhibits a higher value than a limit value of the existing separation membranes.

Figure 1C:
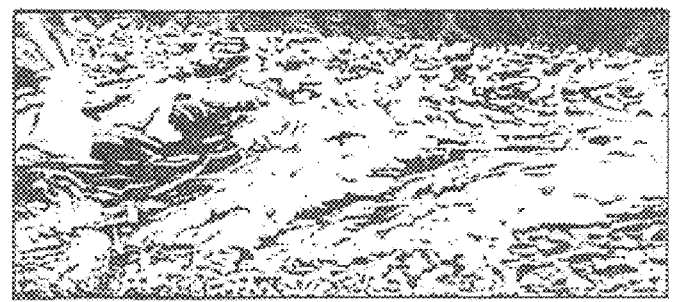
FIG. 1C is a scanning electron microscope of a membrane section generated by ternary blend system of liquid crystalline polymer (10 wt %)/Ultem/compatibilizer (1.3 wt %)
Figure 2C:
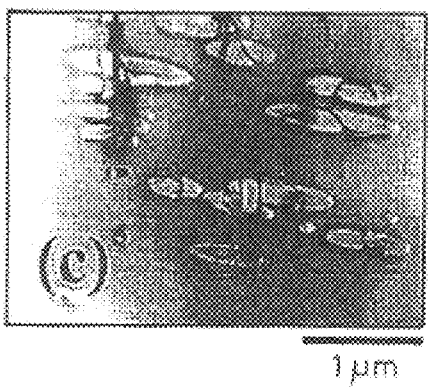
FIG. 2C is a transmission scanning electron microscope of a membrane section generated by a ternary blend of a liquid crystalline polymer (10 wt %)/Ultem/compatibilizer (1.3 wt %).

Meanwhile, in case that an excessive amount of compatibilizer was added (test sample 4), the selectively was rather decreased. This difference results from the fact that, as shown in FIGS. 1B and 2B, in case that a suitable amount of compatibilizer is introduced, the size of the dispersion phase was rapidly reduced compared to the case of the binary system and was evenly dispersed, while, as shown in FIGS. 1C and 2C, if the compatibilizer is added in an excessive amount, it forms its own phase, surrounding the periphery of the dispersed phase, and accordingly, the dispersed phase is coagulated.

In case of the test sample 3 showing the uniform dispersion, as aforementioned, the permeating gas molecules should pass the boundary portion of the impermeable liquid crystalline polymer, of which the distance is proportionate to the square root of the number of dispersed phase, being far more lengthened. The path around the liquid crystalline polymer is occupied by the compatibilizer which interacts differently with oxygen and nitrogen.

Accordingly, the small difference of dispersion constant ends in a much difference of the permeation rate of oxygen and nitrogen while they pass the long distance receiving different interactions from the compatibilizer, resulting in that oxygen comes first, and thus, high permeation rate is obtained. This is similar to the separation principle of a gas chromatography.

On the other hand, in case an excessive amount of compatibilizer was introduced, the path length is reduced due to the coagulation of dispersed phase and the interaction with the compatibilizer also decreased, resulting in lowering of the selectivity.

In the present invention, polyetherimide was used as a matrix, mixed with polyesteramide, a thermotropic liquid crystalline polymer, to which polyesterimide was added as the compatibilizer, thereby fabricating the biaxially extended film by the film blowing process. In view of the morphology of the biaxially extended film, the dispersed phase and the interfacial adhesion were confirmed by the electronic microscopy. In addition, by separating oxygen and nitrogen which are the most difficult to be separated as their molecular sizes are similar, the performance of the film was measured.

As so far described, the thin liquid crystalline polymer blended gas separation membranes fabricated in accordance with the present invention have many advantages.

For example, first, it exhibits the high permeation rate exceeding the limit value which has been hardly overcome by the existing separation membranes.

Secondly, as a separation membrane fabricating technique with a novel concept combining a physical method and a chemical method, since the whole process is performed in the extruder, it does not require a complicated process such as a solution casting method, a post-treatment process such as a solvent recovery and processing is not necessary, and it is also possible to make separation membranes in large scale.

Thirdly, since it can be used between every thermotropic liquid crystalline polymer and thermoplastic resin, it can be used to separate gases having different permeation rate from mixed gases.

Though the present inventors used a single extruder for a monolayer film, it can be extended to multiple layer extruder. Also it can be easily modified to have a pair of counter rotating mandrels for the extrusion die, hence to produce a membrane in which the dispersed liquid crystalline phases are declined to 45° with each other (inside and outside).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. Liquid crystalline polymer blended gas separation membrane obtained by melting and processing 50~99 wt % of a thermoplastic resin, 1~50 wt % of a thermotropic liquid crystalline polymer and 0.1~10 wt % of a compatibilizer based on the weight of the thermotropic liquid crystalline polymer.

2. The liquid crystalline polymer blended gas separation membrane of claim 1, wherein the concentration of the compatibilizer is 0.1~5 wt % based on the weight of the thermotropic liquid crystalline polymer.

3. The liquid crystalline polymer blended gas separation membrane of claim 1, wherein the concentration of the thermotropic liquid crystalline polymer is 5~25 wt %.

4. The liquid crystalline polymer blended gas separation membrane of claim 1, wherein the concentration of the thermoplastic resin is 75~95 wt %.

5. The liquid crystalline polymer blended gas separation membrane of claim 1, wherein the thermotropic liquid crystalline polymer is a polymer containing at least one component selected from the group consisting of a) —O—R—CO—, b) —O—R—O—, c) —OC—R—CO—, d) —NH—R—CO— and e) —NH—R—O—, wherein R represents an aromatic hydrocarbon.

6. The liquid crystalline polymer blended gas separation membrane of claim 5, wherein R is selected from the group consisting of:

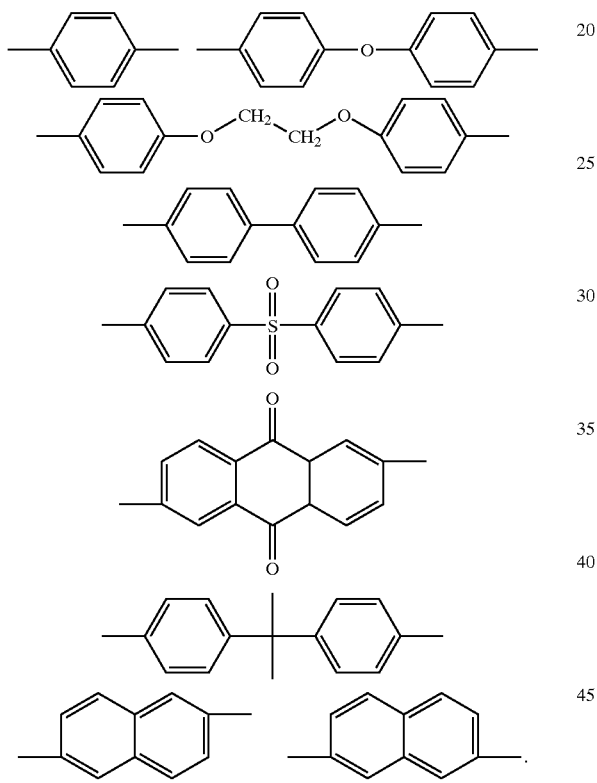

7. The liquid crystalline polymer blended gas separation membrane of claim 6, wherein, hydrogen of R is substituted with at least one substituent selected from the group consisting of alkyl, alkoxy, halogen, phenyl, halogenated phenyl, alkoxylated phenyl and alkylated phenyl.

8. The liquid crystalline polymer blended gas separation membrane of claim 5, wherein the component b) —O—R—O— is selected from the group consisting of:

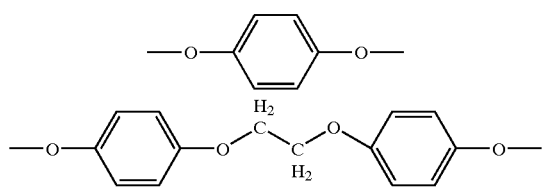

9. The liquid crystalline polymer blended gas separation membrane of claim 1, wherein the thermotropic liquid crystalline polymer is a condensation polymerization product of 2-hydroxy-6-naphthalic acid, terephthalic acid and p-aminophenol.

10. The liquid crystalline polymer blended gas separation membrane of claim 1, wherein the thermoplastic resin has a higher melt viscosity than the viscosity of the liquid crystalline polymer during the melting processing process.

11. The liquid crystalline polymer blended gas separation membrane of claim 1, wherein the thermoplastic resin is a polyetherimide resin.

12. The liquid crystalline polymer blended gas separation membrane of claim 1, wherein the compatibilizer is polyesterimide.

13. The liquid crystalline polymer blended gas separation membrane of claim 1, wherein the compatibilizer is positioned at the interface between the thermoplastic resin and the liquid crystalline polymer, to lower an interfacial tension between the liquid crystalline polymer and the thermoplastic resin, improve the dispersion and strengthen the interfacial adhesion as well as interact differently for different diffusing gas molecules, hence, change the diffusion rate of each gas.

14. A method for preparing a liquid crystalline polymer blended gas separation membrane, comprising the steps of:
   a) forming a melt blend by mixing 50~99 wt % of a thermoplastic resin, 1~50 wt% of a thermotropic liquid crystalline polymer and 0.1~10 wt % of a compatibilizer based on the weight of the thermotropic liquid crystalline polymer; and
   b) biaxially drawing the melt blend obtained from step a) using a film blowing apparatus connected to an extrusion die to fabricate a film.

15. The method of claim 14, wherein a phase of the liquid crystalline polymer has a stripe shape in the film due to the biaxial drawing, in which a drawing ratio in a flow direction of the stripe is higher than a drawing ratio in a circumferential direction.

16. The method of claim 14, wherein a dual mandrel of which the inside and outside are rotated in the opposite direction is used as the extrusion die, so that a morphologically modified liquid crystalline phase is formed in a net shape.

17. The method of claim 14, wherein a multi-layered film is fabricated by using a multiple extrusion die.

18. The method of claim 14, wherein the amount of the compatibilizer is 0.1~5 wt % based on the weight of the thermotropic liquid crystalline polymer.

19. The method of claim 14, wherein the concentration of the thermotropic liquid crystalline polymer is 5~25 wt %.

20. The method of claim 14, wherein the concentration of the thermoplastic resin is 75~95 wt %.

21. A liquid crystalline polymer blended gas separation membrane fabricated by the method of claim 14.

22. A method for separating gases comprising the step of separating one or more gases with the liquid crystalline polymer blended gas separation membrane of claim 21.

* * * * *